United States Patent [19]

Kagawa et al.

[11] Patent Number: 5,219,545
[45] Date of Patent: Jun. 15, 1993

[54] CATALYST AND METHOD FOR CATALYTICALLY DECOMPOSING NITROGEN OXIDES

[75] Inventors: Shuichi Kagawa; Yasutake Teraoka, both of Nagasaki, Japan

[73] Assignee: Tosoh Corporation, Shinnanyo, Japan

[21] Appl. No.: 666,716

[22] Filed: Mar. 8, 1991

[30] Foreign Application Priority Data

Mar. 9, 1990 [JP] Japan .................................. 2-56534
Mar. 9, 1990 [JP] Japan .................................. 2-56535
Apr. 12, 1990 [JP] Japan .................................. 2-95158
Apr. 12, 1990 [JP] Japan .................................. 2-95159

[51] Int. Cl.⁵ ........................... B01J 8/00; C01B 21/00
[52] U.S. Cl. .................................................... 423/239
[58] Field of Search .............. 423/235, 235 D, 239 A, 423/239

[56] References Cited

U.S. PATENT DOCUMENTS

| | | | |
|---|---|---|---|
| 4,104,361 | 8/1978 | Nishikawa et al. | 423/239 |
| 4,447,353 | 5/1984 | Pence et al. | 423/239 |
| 4,950,461 | 8/1990 | Schwetje et al. | 423/239 |
| 5,078,981 | 1/1992 | Kagawa et al. | 423/239 |

FOREIGN PATENT DOCUMENTS

| | | |
|---|---|---|
| 0286967 | 10/1988 | European Pat. Off. . |
| 0299294 | 1/1989 | European Pat. Off. . |
| 0415410 | 3/1991 | European Pat. Off. . |
| 60-125250 | 4/1985 | Japan . |

*Primary Examiner*—Gregory A. Heller
*Attorney, Agent, or Firm*—Oblon, Spivak, McClelland, Maier & Neustadt

[57] ABSTRACT

A catalyst and a method for catalytically decomposing nitrogen oxides, wherein the catalyst comprises a zeolite having a mole ratio of $SiO_2/Al_2O_3$ of at least 20, and containing (i) copper ions and (ii) (a) transition metal ions other than copper ions, (b) at least one alkaline earth metal ion selected from calcium, strontium and barium ions, (c) yttrium ions, or (a) silver ions.

7 Claims, No Drawings

CATALYST AND METHOD FOR CATALYTICALLY DECOMPOSING NITROGEN OXIDES

BACKGROUND OF THE INVENTION

1. Field of the Invention

The present invention relates to a catalyst for removing nitrogen oxides from a gas containing the same, and a method of using the catalyst. More specifically, it relates to a catalyst for catalytically decomposing nitrogen oxides, and a method of using the same. The catalyst of the present invention suffers little deterioration even in the presence of oxygen or a sulfur oxide.

2. Description of the Related Art

Nitrogen oxides in combustion waste gases discharged from, for example, industrial plants and automobiles, are the cause of photochemical smog, and the development of methods of eliminating these substances is a crucial and urgent social need from the standpoint of environmental protection. Among the nitrogen oxides, nitric monoxide (NO) is particularly difficult to remove, and various methods of removing this substance have been investigated. For example, the catalytic reduction method is considered effective, and rapid progress has been made in the development of this method. This method, however, requires the use of a reducing agent such as ammonia, hydrogen or carbon monoxide, and further, requires special equipment for the recovery or decomposition of any unreacted reducing agent. In contrast, the catalytic decomposition method does not require a special additive, such as a reducing agent, and can decompose and separate a nitrogen oxide into nitrogen and oxygen merely by passing the nitrogen oxide through a catalyst bed. Further, the process is advantageously simple, and therefore, has been regarded as the most preferable method. According to previous research, a NO decomposition activity was observed in Pt, CuO, and $Co_3O_4$, among others, but because all of these substances are poisoned by oxygen, which is the decomposition product, they are not practically useful as catalysts.

Accordingly, the present inventors carried out intensive studies of catalysts useful for catalytic decomposition, and found that several kinds of zeolites with exchanged copper ions exhibit a stable decomposition activity. Further, the inventors found that a zeolite containing copper ions and having a specific crystal structure not only exhibits an extremely stable and high activity as a catalytic decomposition catalyst for NO, but also maintains that activity at the same level even in the presence of a sulfur oxide (see Japanese Unexamined Patent Publication (Kokai) NO. 60-125250).

The above-mentioned catalyst, however, does not have a satisfactory activity or heat resistance at high temperatures, and thus can not be put to practical use.

The present inventors have made extensive and intensive studies of the above-mentioned problems, and thus completed the present invention.

SUMMARY OF THE INVENTION

Accordingly, an object of the present invention is to provide a catalytic decomposition catalyst which can efficiently remove nitrogen oxides in the combustion waste gas discharged from, for example, industrial plants and automobiles, even at high temperatures and without the use of ammonia as a reducing agent, and further, maintain a high level of activity even in the presence of a sulfur oxide and oxygen.

Other objects and advantages of the present invention will be apparent from the following description.

In accordance with the present invention, there is provided a catalyst for catalytically decomposing nitrogen oxides comprising a zeolite having a mole ratio of $SiO_2/Al_2O_3$ of at least 20, and containing (i), copper ions and (ii)(a) transition metal ions other than copper ions, (b) at least one alkaline earth metal ion selected from calcium, strontium and barium ions, (c) yttrium ions, or (d) silver ions.

In accordance with the present invention, there is also provided a method of catalytically decomposing nitrogen oxides from a gas containing the same, which comprises bringing said catalyst into contact with the gas containing nitrogen oxides.

DESCRIPTION OF THE PREFERRED EMBODIMENTS

The present invention will now be described in more detail.

Preferably, the zeolite usable in the present invention has a mole ratio of $SiO_2/Al_2O_3$ of at least 20. The upper limit of the mole ratio of $SiO_2/Al_2O_3$ is not particularly limited, but when the mole ratio of $SiO_2/Al_2O_3$ is less than 20, a satisfactory heat resistance can not be obtained. In general, a zeolite having a mole ratio of $SiO_2/Al_2O_3$ of about 20 to 200 is used.

Typical examples of the zeolite constituting the catalyst of the present invention are zeolites such as ZSM-5, ZSM-8 ZSM-11, ZSM-12, ZSM-20, and ZSM-35. Preferably, ZSM-5 is used. The methods of preparation of these zeolites are not particularly limited, and zeolites such as Mordenite, Ferrierite, Y-type zeolite, and L-type zeolite subjected to dealumination also may be used. These zeolites can be used either as such or after treatment with an ammonium salt or a mineral acid and $NH_4$ ion exchange or H ion exchange, before use.

The incorporation of (i) copper ions and (ii)(a) transition metal ions other than copper ions, (b) at least one alkaline earth metal ion selected from calcium, strontium and barium ions, (c) yttrium ions, (d) silver ions in a zeolite having a mole ratio of $SiO_2/Al_2O_3$ of at least 20 is essential to the catalytic decomposition catalyst of the present invention.

There is no particular limitation on the method of incorporating copper ions and transition metal ions other than copper ions, at least one alkaline earth metal ion selected from calcium, strontium and barium ions, yttrium ions, or silver ions in the above-described zeolite, but an ion exchange method is preferred. The ion exchange method may be a method generally practiced in the art. For example, the ion exchange may be conducted by using an aqueous solution containing copper ions and transition metal ions other than copper ions, calcium, strontium or barium ions, yttrium ions, or silver ions. Alternatively, the ion exchange may be conducted by an ion exchange with copper ions followed by an ion exchange with other metal ions, or an ion exchange with metal ions other than copper ions followed by an ion exchange with copper ions. The concentrations of copper ions and other metal ions in the aqueous solution during the ion exchange can be appropriately set in accordance with the degree of ion exchange.

The copper ions and other metal ions can be used in the form of soluble salts such as, for example, nitrates, acetates, oxalates, and chlorides.

During the ion exchange of copper ions as described above, ammonia also may be added to control the pH to thereby increase the copper ion content in the zeolite.

Since the copper ion existing at the ion exchange site of the zeolite is the active site, the copper is preferably exchanged at the ion exchange site. Also, the metal ions other than copper ions are preferably ion-exchanged at the ion exchange site, but the effect thereof also can be exhibited when these metal ions are supported on the zeolite as a compound such as oxide.

There is no particular limitation on the transition metal ions used in the present invention, and preferred examples thereof include cobalt, nickel, chromium, iron, manganese, zinc and platinum ions.

The sample subjected to the ion exchange treatment is subjected to solid-liquid separation, washing and drying before use, and further, can be calcined if necessary.

The degree of ion-exchange of copper is preferably 0.01 to 1.5, more preferably 0.1 to 0.8, as represented in terms of the Cu/Al atomic ratio, and the degree of ion-exchange of metals other than copper is preferably 0.01 or more, more preferably 0.05 to 1, in terms of the atomic ratio to aluminum. When the Cu/Al atomic ratio is less than 0.01, the number of copper ions, which are active sites, is not sufficient to provide the required catalytic activity, and when the ratio exceeds 1.5, copper will exist on the zeolite surface as a compound such as oxide, and thus the effect corresponding to the increased content of the copper ions may not be obtained. When the degree of ion-exchange of metals other than copper is less than 0.01, in terms of the atomic ratio to aluminum, the effect provided by the coexistence of the metal ions other than copper is small, and thus a satisfactory heat resistance may not be obtained.

The $SiO_2/Al_2O_3$ mole ratio of the catalytic decomposition catalyst of the present invention is substantially the same as the $SiO_2/Al_2O_3$ mole ratio of the zeolite base material used. Also, the crystal structure of the catalytic decomposition catalyst after ion exchange remains substantially unchanged, compared with that before the ion exchange.

Further, the catalytic decomposition catalyst of the present invention can be used as a mixture molded with a binder, such as a clay mineral, and further, the zeolite may be previously molded and copper and other metal ions incorporated by ion exchange into the molded product. The binder usable during the molding of the zeolite may include clay minerals such as kaolin, attapulgite, montmorillonite, bentonite, allophane, and sepiolite. Alternatively, a binderless zeolite molded product obtained by a direct molding without the use of a binder may be used. Further, it is also possible to coat a base material in a honeycomb form made of cordierite or a metal, with a zeolite.

A catalytic decomposition of nitrogen oxides in the waste gas can be performed by bringing the catalytic decomposition catalyst of the present invention into contact with a waste gas containing nitrogen oxides.

The catalytical decomposition of nitrogen oxides in a waste gas is preferably carried out under the conditions of a temperature of 100° C. to 1000° C., more preferably 150° C. to 800° C. and a contact time with the catalyst of 0.01 to 10 g.sec/ml, more preferably 0.03 to 8 g.sec/ml.

The above-mentioned catalytic decomposition catalyst can exhibit a catalytic performance equal to that of the conventional zeolite catalyst having copper supported thereon, even when applied to a waste gas containing, for example, ammonia, carbon monoxide, hydrocarbons, water, oxygen, and sulfur oxides.

As disclosed in Japanese Unexamined Patent Publication (Kokai) No. 60-125250, a crystalline aluminosilicate having a specific structure containing copper ions can efficiently remove nitrogen oxides even from a waste gas not containing a reducing agent. This is because a specific structure of the crystalline aluminosilicate facilitates the redox cycle of copper ions subjected to an ion exchange, and the nitrogen oxides are decomposed through the redox cycle into nitrogen and oxygen. Further, the copper ions are less susceptible to poisoning by oxygen as a decomposition product of the nitrogen oxides, which enables the decomposition activity to be maintained at a high level for long periods.

In the above-mentioned crystalline aluminosilicate ion-exchanged with copper ions, however, the reduction of the copper ions is excessive at a high temperature, which hinders the redox cycle of the copper ions, and thus a satisfactory activity cannot be obtained.

The catalyst of the present invention comprises a zeolite, and incorporated therein, (i) copper ions and (ii)(a) transition metal ions other than copper ions, (b) at least one alkaline earth metal ion selected from calcium, strontium and barium ions, (c) yttrium ions, or (d) silver ions. The coexistence of the specific metal ions other than copper ions contributes to not only an improvement in the heat resistance of the zeolite per se but also the prevention of an excessive reduction of the copper ions. This accelerates the redox cycle of the copper ions, and thus a catalytic decomposition catalyst having a high activity and stability, even at high temperatures, is obtained.

The nitrogen oxide catalytic decomposition catalyst of the present invention can efficiently remove nitrogen oxides in a combustion waste gas even at a high temperature, without the use of a reducing agent such as ammonia, and further, has a very high heat resistance. Therefore, nitrogen oxides can be removed from a waste gas even at a high temperature by bringing the catalyst of the present invention into contact with the waste gas.

EXAMPLES

The present invention will now be described in more detail by, but is by no means limited to, the following Examples.

Example 1

An aqueous sodium silicate solution ($SiO_2$: 153 g/liter; $Na_2O$: 50 g/liter; $Al_2O_3$: 0.8 g/liter) and an aqueous aluminum sulfate solution ($Al_2O_3$: 38.4 g/liter; $H_2SO_4$: 275 g/liter) were continuously fed respectively at rates of 3.2 liters/hr and 0.8 liter/hr into an overflow type reactor having a net volume of 2 liters, while stirring. The reaction temperature was 30° to 32° C., and the pH of the discharged slurry was 6.4 to 6.6.

The discharged slurry was subjected to solid-liquid separation, and the solid was thoroughly washed with water to obtain a granular amorphous aluminosilicate uniform compound having an $Na_2O$ content of 1.72% by weight, an $Al_2O_3$ content of 2.58% by weight, an $SiO_2$ content of 39.3% by weight, and an $H_2O$ content of 56.4% by weight. An autoclave was charged with 2,840 g of the uniform compound and 5160 g of a 1.39% by weight aqueous NaOH solution, and crystallization was effected at 160° C for 72 hr with stirring. The product was subjected to solid-liquid separation, and the solid was washed with water and dried to obtain a ZSM-5 type zeolite. The zeolite was subjected to a chemical analysis, and as a result, found to have the following composition in terms of mole ratios of oxides on an anhydrous basis:

1.1 $Na_2O$, $Al_2O_3$ and 23.3 $SiO_2$

To one liter of a 0.012N aqueous cobalt nitrate solution was added 10 g of this zeolite, and the mixture was stirred at 60° C. for one day and then washed to obtain a zeolite ion-exchanged with cobalt. Subsequently, the zeolite thus obtained was added to one liter of a 0.024N aqueous copper acetate solution. The mixture was stirred at 60° C. for one day, washed, and dried to prepare a catalyst 1. The catalyst 1 thus prepared was subjected to chemical analysis, and as a result, found to have the following composition in terms of mole ratios of oxides on an anhydrous basis:

0.43 CoO, 0.75 CuO, $Al_2O_3$ and 23.3 $SiO_2$.

Example 2

A catalyst 2 was prepared in the same manner as that of Example 1, except that 10 g of the ZSM-5 type zeolite prepared in Example 1 was used and nickel acetate was used instead of cobalt nitrate.

The catalyst 2 thus prepared was subjected to chemical analysis, and as a result, found to have the following composition in terms of mole ratios of oxides on an anhydrous basis:

0.60 NiO, 0.75 CuO, $Al_2O_3$ and 23.3 $SiO_2$.

Example 3

A catalyst 3 was prepared in the same manner as that of Example 1, except that 10 g of the ZSM-5 type zeolite prepared in Example 1 was used and chromium acetate was used instead of cobalt nitrate.

The catalyst 3 thus prepared was subjected to chemical analysis, and as a result, found to have the following composition in terms of mole ratios of oxides on an anhydrous basis:

0.09 $Cr_2O_3$, 1.05 CuO, $Al_2O_3$ and 23.3 $SiO_2$.

Example 4

A catalyst 4 was prepared in the same manner as that of Example 1, except that 10 g of the ZSM-5 type zeolite prepared in Example 1 was used and iron nitrate was used instead of cobalt nitrate.

The catalyst 4 thus prepared was subjected to chemical analysis, and as a result, found to have the following composition in terms of mole ratios of oxides on an anhydrous basis:

0.41 FeO, 0.92 CuO, $Al_2O_3$ and 23.3 $SiO_2$.

Example 5

The catalyst prepared in Examples 1, 2, 3 and 4 were used for evaluation of the catalytic decomposition performance. The catalysts were press-molded and then pulverized to regulate the granule size to 42 to 80 mesh, and 2 cc of the granules was filled in an atmospheric pressure fixed bed flow type reaction tube. A pretreatment was conducted in a helium gas at 500° C. for one hr, and a helium gas containing 0.48% of NO was passed through the reaction tube in such a manner that the contact time was 4.0 g.sec/ml.

The NO conversions at respective temperatures are shown in Table 1.

TABLE 1

| Temp. | NO conversion (%) | | | |
|---|---|---|---|---|
| | Catalyst 1 | Catalyst 2 | Catalyst 3 | Catalyst 4 |
| 400° C. | 55 | 40 | 45 | 51 |
| 500° C. | 67 | 63 | 66 | 62 |
| 600° C. | 57 | 63 | 50 | 42 |
| 700° C. | 29 | 36 | 16 | 10 |

Comparative Example 1

To one liter of a 0.012 N aqueous copper acetate solution was added 10 g of the ZSM-5 type zeolite prepared in Example 1. The mixture was stirred at 60° C. for one day, washed, and dried to prepare a comparative catalyst 1. The comparative catalyst 1 thus prepared was subjected to chemical analysis, and as a result, found to have the following composition in terms of mole ratios of oxides on an anhydrous basis:

0.64 $Na_2O$, 0.69 CuO, $Al_2O_3$ and 23.3 $SiO_2$.

Comparative example 2

The catalyst prepared in Comparative Example 1 was used for evaluation of the catalytic decomposition performance in the same manner as that of Example 5.

The results are shown in Table 2.

TABLE 2

| Temp. | NO conversion (%) |
|---|---|
| 400° C. | 50 |
| 500° C. | 48 |
| 600° C. | 29 |
| 700° C. | 10 |

EXAMPLE 6

A catalyst 5 was prepared in the same manner as that of Example 1, except that 10 g of the ZSM-5 type zeolite prepared in Example 1 was used and manganese nitrate was used instead of cobalt nitrate.

The catalyst 5 thus prepared was subjected to chemical analysis, and as a result, found to have the following composition in terms of mole ratios of oxides on an anhydrous basis:

0.68 MnO, 0.71 CuO, $Al_2O_3$ and 23.3 $SiO_2$.

Example 7

A catalyst 5 was prepared in the same manner as that of Example 1, except that 10 g of the ZSM-5 type zeolite prepared in Example 1 was used and zinc acetate was used instead of cobalt nitrate.

The catalyst 6 thus prepared was subjected to chemical analysis, and as a result, found to have the following composition in terms of mole ratios of oxides on an anhydrous basis:

0.62 ZnO, 0.76 CuO, $Al_2O_3$ and 23.3 $SiO_2$.

Example 8

A catalyst 7 was prepared in the same manner as that of Example 1, except that 10 g of the ZSM-5 type zeolite prepared in Example 1 was used and chloroplatinic acid was used instead of cobalt nitrate.

The catalyst 7 thus prepared was subjected to chemical analysis, and as a result, found to have the following composition in terms of mole ratios of oxides on an anhydrous basis:

0.15 PtO, 1.07 CuO, Al$_2$O$_3$ and 23.3 SiO$_2$.

Example 9

The catalyst prepared in Examples 6, 7 and 8 was used for evaluation of the catalytic decomposition performance in the same manner as that of Example 5.

The results are shown in Table 3.

TABLE 3

| Temp. | NO conversion (%) | | |
|---|---|---|---|
| | Catalyst 5 | Catalyst 6 | Catalyst 7 |
| 400° C. | 34 | 45 | 47 |
| 500° C. | 56 | 63 | 67 |
| 600° C. | 53 | 52 | 54 |
| 700° C. | 28 | 15 | 16 |

Example 10

An aqueous sodium silicate solution (SiO$_2$: 153 g/liter; Na$_2$O: 50 g/liter; Al$_2$O$_3$: 0.8 g/liter) and an aqueous aluminum sulfate solution (Al$_2$O$_3$: 38.4 g/liter; H$_2$SO$_4$: 274 g/liter were continuously fed respectively at rates of 3.2 liters/hr and 0.8 liter/hr into an overflow type reactor having a net volume of 2 liters, while stirring. The reaction temperature was 30 to 32° C., and the pH of the discharged slurry was 6.4 to 6.6.

The discharged slurry was subjected to solid-liquid separation, and the solid was thoroughly washed with water to obtain a granular amorphous aluminosilicate uniform compound having an Na$_2$O content of 1.72% by weight, an Al$_2$O$_3$ content of 2.58% by weight, an SiO$_2$ content of 39.3% by weight, and an H$_2$O content of 56.4% by weight. An autoclave was charged with 2.840 g of the uniform compound and 5,160 g of a 1.39% by weight aqueous NaOH solution, and crystallization was effected at 160° C. for 72 hr with stirring. The product was subjected to solid-liquid separation, and the solid was washed with water and dried to obtain a ZSM-5 type zeolite. The zeolite was subjected to chemical analysis, and as a result, found to have the following composition in terms of mole ratios of oxides on an anhydrous basis:

1.1 Na$_2$O, Al$_2$O$_3$ and 23.3 SiO$_2$.

To one liter of a 0.012N aqueous calcium nitrate solution was added 10 g of this zeolite. The mixture was stirred at 60° C. for one day and then washed to obtain a zeolite ion-exchanged with calcium. Subsequently, the zeolite thus obtained was added to one liter of a 0.024N aqueous copper acetate solution. The mixture was stirred at 60° C. for one day, washed and dried to prepare a catalyst 8. The catalyst 8 thus prepared was subjected to chemical analysis, and as a result, found to have the following composition in terms of mole ratios of oxides on an anhydrous basis:

0.45 CaO, 0.65 CuO, Al$_2$O$_3$ and 23.3 SiO$_2$.

Example 11

A catalyst 9 was prepared in the same manner as that of Example 10, except that 10 g of the ZSM-5 type zeolite prepared in Example 10 was used and strontium acetate was used instead of calcium nitrate.

The catalyst 9 thus prepared was subjected to chemical analysis, and as a result, found to have the following composition in terms of mole ratios of oxides on an anhydrous basis:

0.25 SrO, 0.88 CuO, Al$_2$O$_3$ and 23.3 SiO$_2$.

Example 12

A catalyst 10 was prepared in the same manner as that of Example 10, except that 10 g of the ZSM-5 type zeolite prepared in Example 10 was used and barium nitrate was used instead of calcium nitrate.

The catalyst 10 thus prepared was subjected to chemical analysis, and as a result, found to have the following composition in terms of mole ratios of oxides on an anhydrous basis:

0.40 BaO, 0.76 CuO, Al$_2$O$_3$ and 23.3 SiO$_2$.

Example 13

The catalysts prepared in Example Nos. 10, 11, and 12 were used for evaluation of the catalytic decomposition performance in the same manner as that of Example 5.

The NO conversions at respective temperatures are shown in Table 4.

TABLE 4

| Temp. | NO conversion (%) | | |
|---|---|---|---|
| | Catalyst 8 | Catalyst 9 | Catalyst 10 |
| 400° C. | 64 | 45 | 57 |
| 500° C. | 70 | 66 | 68 |
| 600° C. | 62 | 60 | 57 |
| 700° C. | 27 | 30 | 38 |

Example 14

An aqueous sodium silicate solution (SiO$_2$ g/liter; Na$_2$O: 50 g/liter; Al$_2$O$_3$: 0.8 g/liter) and an aqueous aluminum sulfate solution (Al$_2$O$_3$: 38.4 g/liter; H$_2$SO$_4$: 275 g/liter) were continuously fed respectively at rates of 3.2 liters/hr and 0.8 liter/hr into an overflow type reactor having a net volume of 2 liters, while stirring. The reaction temperature was 30° to 32° C., and the pH of the discharged slurry was 6.4 to 6.6.

The discharged slurry was subjected to solid-liquid separation, and the solid was thoroughly washed with water to obtain a granular amorphous aluminosilicate uniform compound having an Na$_2$O content of 1.72% by weight, an Al$_2$O$_3$ content of 2.58% by weight, an SiO$_2$ content of 39.3% by weight, and an H$_2$O content of 56.4% by weight. An autoclave was charged with 2,840 g of the uniform compound and 5,160 g of a 1.39% by weight aqueous NaOH solution, and crystallization was effected at 160° C. for 72 hr with stirring. The product was subjected to solid-liquid separation, and the solid was washed with water and dried to obtain a ZSM-5 type zeolite. The zeolite was subjected to chemical analysis, and as a result, found to have the following composition in terms of mole ratios of oxides on an anhydrous basis:

1.1 Na$_2$O, Al$_2$O$_3$ and 23.3 SiO$_2$.

To one liter of a 0.012N aqueous yttrium nitrate solution was added 10 g of this zeolite. The mixture was stirred at 60° C. for one day and then washed to obtain a zeolite ion-exchanged with yttrium. Subsequently, the zeolite thus obtained was added to one liter of a 0.024N aqueous copper acetate solution. The mixture was stirred at 60° C. for one day, washed and dried to prepare a catalyst 11. The catalyst 11 thus prepared was subjected to chemical analysis, and as a result, found to have the following composition in terms of mole ratios of oxides on an anhydrous basis:

0.28 Y$_2$O$_3$, 1.05 CuO, Al$_2$O$_3$ and 23.3 SiO$_2$.

Example 15

The catalyst prepared in Example 14 was used for an evaluation of the catalytic decomposition performance, in the same manner as that of Example 5.

The conversions of NO into $N_2$ at respective temperatures are given in Table 5.

TABLE 5

| Temp. | Conversion (%) into $N_2$ |
|---|---|
| 450° C. | 65 |
| 500° C. | 70 |
| 550° C. | 68 |
| 600° C. | 59 |
| 700° C. | 24 |

Comparative Example 3

To one liter of a 0.024 N aqueous copper acetate solution was added 10 g of the ZSM-5 type zeolite prepared in Example 15. The mixture was stirred at 60° C. for one day, washed and dried to prepare a comparative catalyst 2. the comparative catalyst 2 thus prepared was subjected to chemical analysis, and as a result, found to have the following composition in terms of mole ratios on an anhydrous basis:

0.15 $Na_2O$, 1,33 CuO, $Al_2O_3$ and 23.3 $SiO_2$.

comparative Example 4

To one liter of a 0.012 N aqueous yttrium nitrate solution was added 10 g of the ZSM-5 type zeolite prepared in Example 15. the mixture was stirred at 60° C. for one day, washed and dried to prepare a comparative catalyst 3. The comparative catalyst 3 thus prepared was subjected to chemical analysis, and as a result, found to have the following composition in terms of mole ratios on an anhydrous basis:

0.75 $Y_2O_3$, $Al_2O_3$ and 23.3 $SiO_2$.

Comparative Example 5

The catalyst prepare din comparative Examples 3 and 4 was used for evaluation of the catalytic decomposition performance in the same manner as that of Example 5.

The results are shown in Table 6.

TABLE 6

| | Conversion (%) into $N_2$ Comparative catalyst | |
|---|---|---|
| Temp. | 3 | 4 |
| 450° C. | 67 | 0 |
| 500° C. | 65 | 0 |
| 550° C. | 63 | 0 |
| 600° C. | 54 | 0 |
| 700° C. | 22 | 0 |

Example 16

An aqueous sodium silicate solution ($SiO_2$: 153 g/liter; $Na_2O$: 50 g/liter; $Al_2O_3$: 0.8 g/liter) and an aqueous aluminum sulfate solution ($Al_2O_3$: 38.4 g/liter; $H_2SO_4$: 275 g/liter) were continuously fed respectively at rates of 3.2 liters/hr and 0.8 liter/hr into an overflow type reactor having a net volume of 2 liters, while stirring. The reaction temperature was 30° to 32° C., and the pH of the discharged slurry was 6.4 to 6.6.

The discharged slurry was subjected to a slid-liquid separation, and the solid was thoroughly washed with water to obtain a granular amorphous aluminosilicate uniform compound having an $Na_2O$ content of 1.72% by weight, an $Al_2O_3$ content of 2.58% by weight, an $SiO_2$ content of 39.3% by weight, and an $H_2O$ content of 56.4% by weight. An autoclave was charged with 2,840 g of the uniform compound and 5,160 g of a 1.39% by weight aqueous NaOH solution, and crystallization was effected at 160° C. for 72 hr with stirring. The product was subjected to solid-liquid separation, and the solid was washed with water and dried to obtain a ZSM-5 type zeolite. The zeolite was subjected to chemical analysis, and as a result, found to have the following composition in terms of mole ratios of oxides on an anhydrous basis:

1.1 $Na_2O$, $Al_2O_3$ and 23.3 $SiO_2$.

To one liter of a 0.012N aqueous silver nitrate solution was added 10 g of this zeolite. The mixture was stirred at 60° C. for one day under a light-shielded condition and then washed to obtain a zeolite ion-exchanged with silver. Subsequently, the zeolite thus obtained was added to one liter of a 0.024N aqueous copper acetate solution. The mixture was stirred at 60° C. for one day under a light-shielded condition, washed and dried to prepare a catalyst 12. The catalyst 12 thus prepared was subjected to chemical analysis, and as a result, found to have the following composition in terms of mole ratios of oxides on an anhydrous basis:

0.32 $Ag_2O$, 1.01 CuO $Al_2O_3$ and 23.3 $SiO_2$.

Example 17

The catalyst prepared in Example 16 was used for an evaluation of the catalytic decomposition performance, in the same manner as that of Example 5.

The conversions of NO into $N_2$ at respective temperatures are given in Table 7.

TABLE 7

| Temp. | Conversion (%) into $N_2$ |
|---|---|
| 450° C. | 67 |
| 500° C. | 72 |
| 550° C. | 70 |
| 600° C. | 58 |
| 700° C. | 25 |

Comparative Example 6

To one liter of a 0.012N aqueous silver nitrate solution was added 10 g of the ZSM-5 type zeolite prepared in Example 16. The mixture was stirred at 60° C. for one day under a light-shielded condition, washed, and dried to prepare a comparative catalyst 4. The comparative catalyst 4 thus prepared was subjected to chemical analysis, and as a result, found to have the following composition in terms of mole ratios of oxides on an anhydrous basis:

0.95 $Ag_2O$, $Al_2O_3$ and 23.3 $SiO_2$.

Comparative Example 7

The catalyst prepared in Comparative Example 6 was used for an evaluation of the catalytic decomposition performance, in the same manner as that of Example 5.

The results are given in Table 8.

TABLE 8

| Temp. | Conversion (%) into $N_2$ Comparative Catalyst |
|---|---|
| 450° C. | 0 |
| 500° C. | 0 |
| 550° C. | 0 |
| 600° C. | 0 |

TABLE 8-continued

| Temp. | Conversion (%) into $N_2$ Comparative Catalyst |
|---|---|
| 700° C. | 0 |

We claim:

1. A method of removing nitrogen oxides from a gas containing the same by catalytically decomposing the nitrogen oxide, which comprises bringing a catalyst into contact with the gas containing nitrogen oxides, said catalyst comprising a zeolite having a mole ratio of $SiO_2/Al_2O_3$ of at least 20 and containing (i) 0.01 to 1.5, in terms of the atomic ratio of Cu per al in the zeolite of copper ions and (ii) (a) transition metal ions other than copper ions, (b) at least one alkaline earth metal ion selected from calcium, strontium, and barium ions, (c) yttrium ions, or (d) silver ions, the amount of the metal ions (ii) being at least 0.01 in terms of the atomic ratio of the metal ions per Al in the zeolite.

2. A method as claimed in claim 1, wherein said catalyst comprises a zeolite having a mole ratio of $SiO_2/Al_2O_3$ of at least 20 and containing (i) copper ions and (ii) transition metal ions other than copper ions.

3. A method as claimed in claim 1, wherein said catalyst comprises a zeolite having a mole ratio of $SiO_2/Al_2O_3$ of at least 20 and containing (i) copper ions and (ii) at least one alkaline earth metal ion selected from calcium, strontium, and barium ions.

4. A method as claimed in claim 1, wherein said catalyst comprises a zeolite having a mole ratio of $SiO_2/Al_2O_3$ of at least 20 and containing (i) copper ions and (ii) yttrium.

5. A method as claimed in claim 1, wherein said catalyst comprises a zeolite having a mole ratio of $SiO_2/Al_2O_3$ of at least 20 and containing (i) copper ions and (ii) silver ions.

6. A method of removing nitrogen oxides from a gas containing the same by catalytically decomposing the nitrogen oxide, which comprises bringing a catalyst into contact with the gas containing nitrogen oxides in the absence of ammonia, said catalyst comprising a zeolite having a mole ratio of $SiO_2/Al_2O_3$ of at least 20 and containing (i) 0.01 to 1.5, in terms of the atomic ratio of Cu per Al in the zeolite of copper ions and (ii) (a) transition metal ions other than copper ions, (b) at least one alkaline earth metal ion selected from calcium, strontium, and barium ions, (c) yttrium ions, or (d) silver ions, the amount of the metal ions (ii) being at least 0.01 in terms of the atomic ratio of the metal ions per al in the zeolite.

7. A method of removing nitrogen oxides from a gas containing the same by catalytically decomposing the nitrogen oxide, which comprises bringing a catalyst into contact with the gas containing nitrogen oxides in the absence of a hydrocarbon, said catalyst comprising a zeolite having a mole ratio of $SiO_2/Al_2O_3$ of at least 20 and containing (i) 0.01 to 1.5, in terms of the atomic ratio of Cu per Al in the zeolite of copper ions and (ii) (a) transition metal ions other than copper ions, (b) at least one alkaline earth metal ion selected from calcium, strontium, and barium ions, (c) yttrium ions, or (d) silver ions, the amount of the metal ions (ii) being at least 0.01 in terms of the atomic ratio of the metal ions per Al in the zeolite.

* * * * *

UNITED STATES PATENT AND TRADEMARK OFFICE
CERTIFICATE OF CORRECTION

PATENT NO. : 5,219,545

DATED : June 15, 1993

INVENTOR(S) : Kagawa et al

It is certified that error appears in the above-identified patent and that said Letters Patent is hereby corrected as shown below:

On column 11, line 14, Claim 1:

"al" should read --Al--.

On column 12, line 17, Claim 6:

"al" should read --Al--.

Signed and Sealed this

Fifth Day of July, 1994

*Attest:*

BRUCE LEHMAN

*Attesting Officer*  *Commissioner of Patents and Trademarks*